United States Patent
Kaku et al.

(10) Patent No.: US 12,412,335 B2
(45) Date of Patent: Sep. 9, 2025

(54) TERMINAL APPARATUS, NON-TRANSITORY COMPUTER READABLE MEDIUM, AND IMAGE DISPLAY METHOD

(71) Applicant: TOYOTA JIDOSHA KABUSHIKI KAISHA, Toyota (JP)

(72) Inventors: Wataru Kaku, Musashino (JP); Daisuke Kikuchi, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 225 days.

(21) Appl. No.: 18/318,112

(22) Filed: May 16, 2023

(65) Prior Publication Data

US 2023/0377252 A1 Nov. 23, 2023

(30) Foreign Application Priority Data

May 17, 2022 (JP) .................. 2022-081181

(51) Int. Cl.
*G06T 15/60* (2006.01)
*G06F 3/14* (2006.01)

(52) U.S. Cl.
CPC ............ *G06T 15/60* (2013.01); *G06F 3/1423* (2013.01)

(58) Field of Classification Search
CPC ....... G06T 15/60; G06T 19/00; G06F 3/1423; G06F 3/1446; G06F 3/017; G06F 3/04815; G09G 2300/026; H04N 7/157
See application file for complete search history.

(56) References Cited

U.S. PATENT DOCUMENTS

| | | | | |
|---|---|---|---|---|
| 9,800,931 B1* | 10/2017 | Tangeland | ......... | H04N 21/4312 |
| 2014/0359492 A1* | 12/2014 | Postal | ................. | G06F 3/1446 |
| | | | | 715/761 |
| 2021/0006749 A1* | 1/2021 | Koike | ................. | G06F 3/1454 |
| 2021/0019982 A1* | 1/2021 | Todd | ................. | H04N 21/2343 |

FOREIGN PATENT DOCUMENTS

| | | | |
|---|---|---|---|
| JP | H11-316853 A | | 11/1999 |
| JP | 2004-297766 A | | 10/2004 |
| JP | 4098882 B2 | * | 6/2008 |
| JP | 2011-513871 A | | 4/2011 |
| JP | 2016-218830 A | | 12/2016 |
| JP | 2021-535526 A | | 12/2021 |
| WO | 2009/112967 A1 | | 9/2009 |
| WO | 2019/187747 A1 | | 10/2019 |
| WO | 2020/051111 A1 | | 3/2020 |

* cited by examiner

*Primary Examiner* — Yingchun He
(74) *Attorney, Agent, or Firm* — Oliff PLC

(57) ABSTRACT

A terminal apparatus is a terminal apparatus configured to display a user image being an image of a first user to a second user in a second space separate from a first space in which the first user is present, the terminal apparatus including a controller configured to display, on a vertical display plane extending in a vertical direction, a first image being an image of a desk or a floor, together with the user image, display, on a horizontal display plane extending in a horizontal direction, a second image being a continuous image with the first image, the horizontal display plane being adjacent to a lower end of the vertical display plane, and when displaying the first image and the second image, draw a pattern on the first image and a pattern on the second image as continuous patterns with each other.

8 Claims, 8 Drawing Sheets

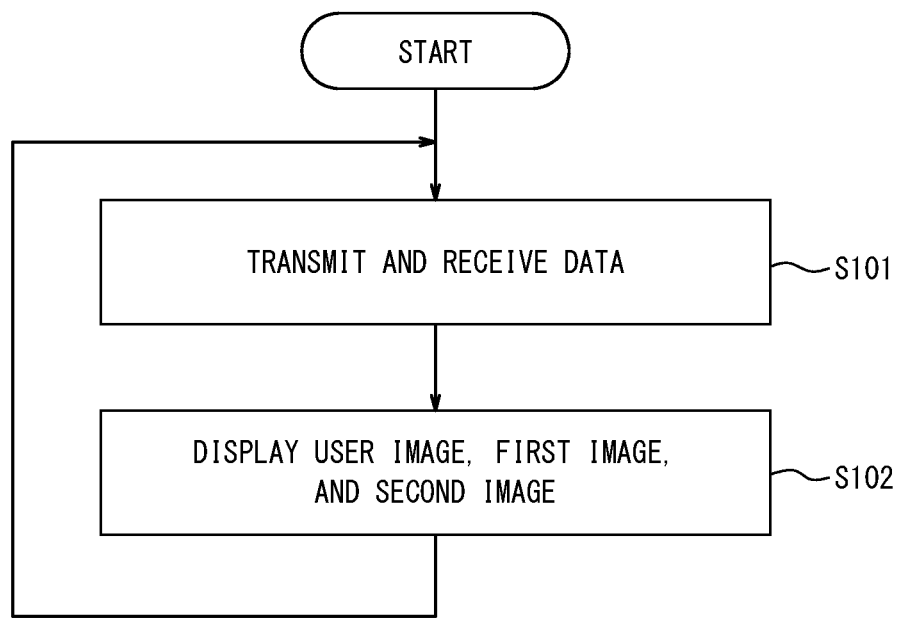

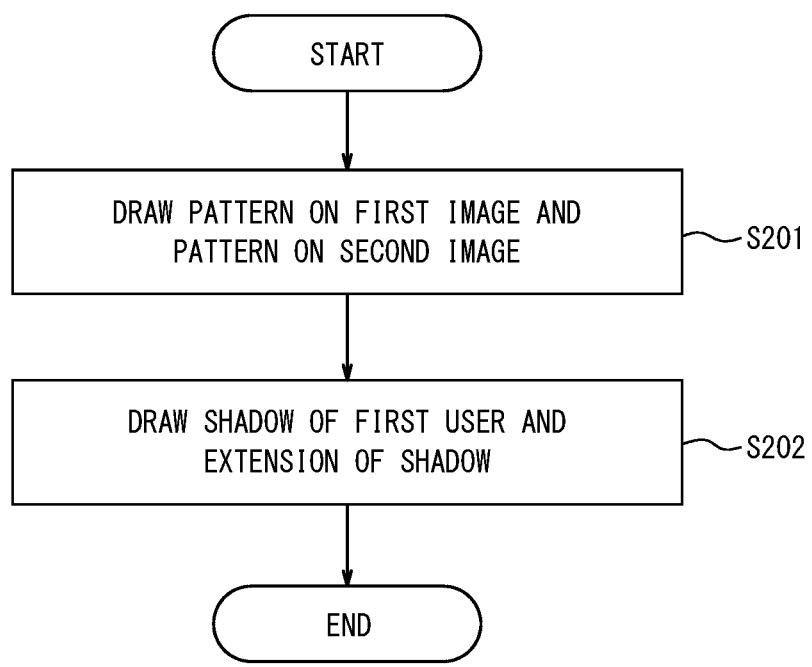

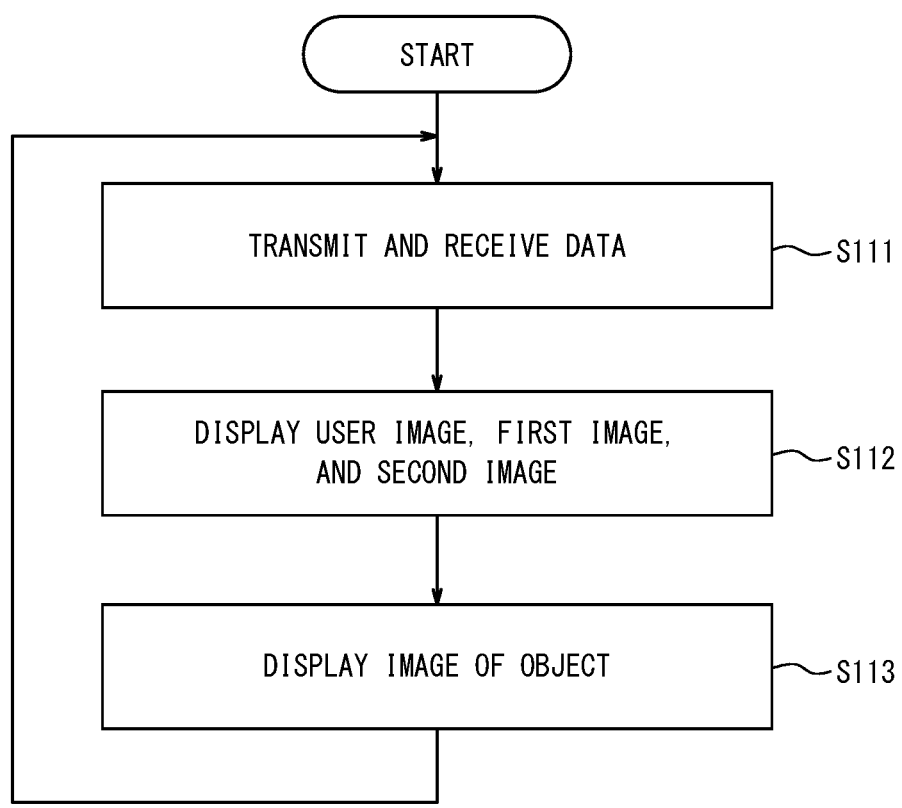

TERMINAL APPARATUS, NON-TRANSITORY COMPUTER READABLE MEDIUM, AND IMAGE DISPLAY METHOD

CROSS-REFERENCE TO RELATED APPLICATION

This application claims priority to Japanese Patent Application No. 2022-081181 filed on May 17, 2022, the entire contents of which are incorporated herein by reference.

TECHNICAL FIELD

The present disclosure relates to a terminal apparatus, a program, and an image display method.

BACKGROUND

In the system disclosed in Patent Literature (PTL) 1, a video of a hand of a user's interlocutor is first displayed on a display on the user's side. The video is then switched to a video of a video camera installed behind the display. When the user reaches out his/her hand to behind the display, a video of the user's hand is displayed on the display through the video camera. A robotic hand, which is formed to mimic a hand-to-elbow portion of the interlocutor's arm and installed under the display, then moves to enter the video camera's angle of view. When the user further extends his/her hand to shake the robotic hand, a video of the user shaking the robotic hand is displayed on the display through the video camera.

CITATION LIST

Patent Literature

PTL 1: JP 2016-218830 A

SUMMARY

The conventional system attempts to give a user the illusion of being in the same space as an interlocutor by installing a robotic hand under a display or by switching videos to be displayed on the display, but it is unclear whether the user actually perceives such an illusion. Moreover, the conventional system has many restrictions, such as the need to install the robotic hand and switch the videos, which causes low flexibility in application.

It would be helpful to make it easier for users to have senses of being in the same space as interlocutors.

A terminal apparatus according to the present disclosure is a terminal apparatus configured to display a user image being an image of a first user to a second user in a second space separate from a first space in which the first user is present, the terminal apparatus including a controller configured to:
  display, on a vertical display plane extending in a vertical direction, a first image being an image of a desk or a floor, together with the user image;
  display, on a horizontal display plane extending in a horizontal direction, a second image being a continuous image with the first image, the horizontal display plane being adjacent to a lower end of the vertical display plane; and
  when displaying the first image and the second image, draw a pattern on the first image and a pattern on the second image as continuous patterns with each other.

A program according to the present disclosure is configured to cause a computer to execute operations, the computer being configured to display a user image being an image of a first user to a second user in a second space separate from a first space in which the first user is present, the operations including:
  displaying, on a vertical display plane extending in a vertical direction, a first image being an image of a desk or a floor, together with the user image;
  displaying, on a horizontal display plane extending in a horizontal direction, a second image being a continuous image with the first image, the horizontal display plane being adjacent to a lower end of the vertical display plane; and
  when displaying the first image and the second image, drawing a pattern on the first image and a pattern on the second image as continuous patterns with each other.

An image display method according to the present disclosure is an image display method to display a user image being an image of a first user to a second user in a second space separate from a first space in which the first user is present, the image display method including:
  displaying, on a vertical display plane extending in a vertical direction, a first image being an image of a desk or a floor, together with the user image;
  displaying, on a horizontal display plane extending in a horizontal direction, a second image being a continuous image with the first image, the horizontal display plane being adjacent to a lower end of the vertical display plane; and
  when displaying the first image and the second image, drawing a pattern on the first image and a pattern on the second image as continuous patterns with each other.

According to the present disclosure, it is easier for users to have senses of being in the same space as interlocutors.

BRIEF DESCRIPTION OF THE DRAWINGS

In the accompanying drawings:
FIG. 6 is a flowchart illustrating operations of a terminal apparatus according to the embodiment of the present disclosure;
FIG. 7 is a flowchart illustrating a procedure of processes to be performed in step S102 of FIG. 6 to display first and second images;
and
  FIG. 8 is a flowchart illustrating a variation of the operations of the terminal apparatus according to the embodiment of the present disclosure.

DETAILED DESCRIPTION

Figure 1:
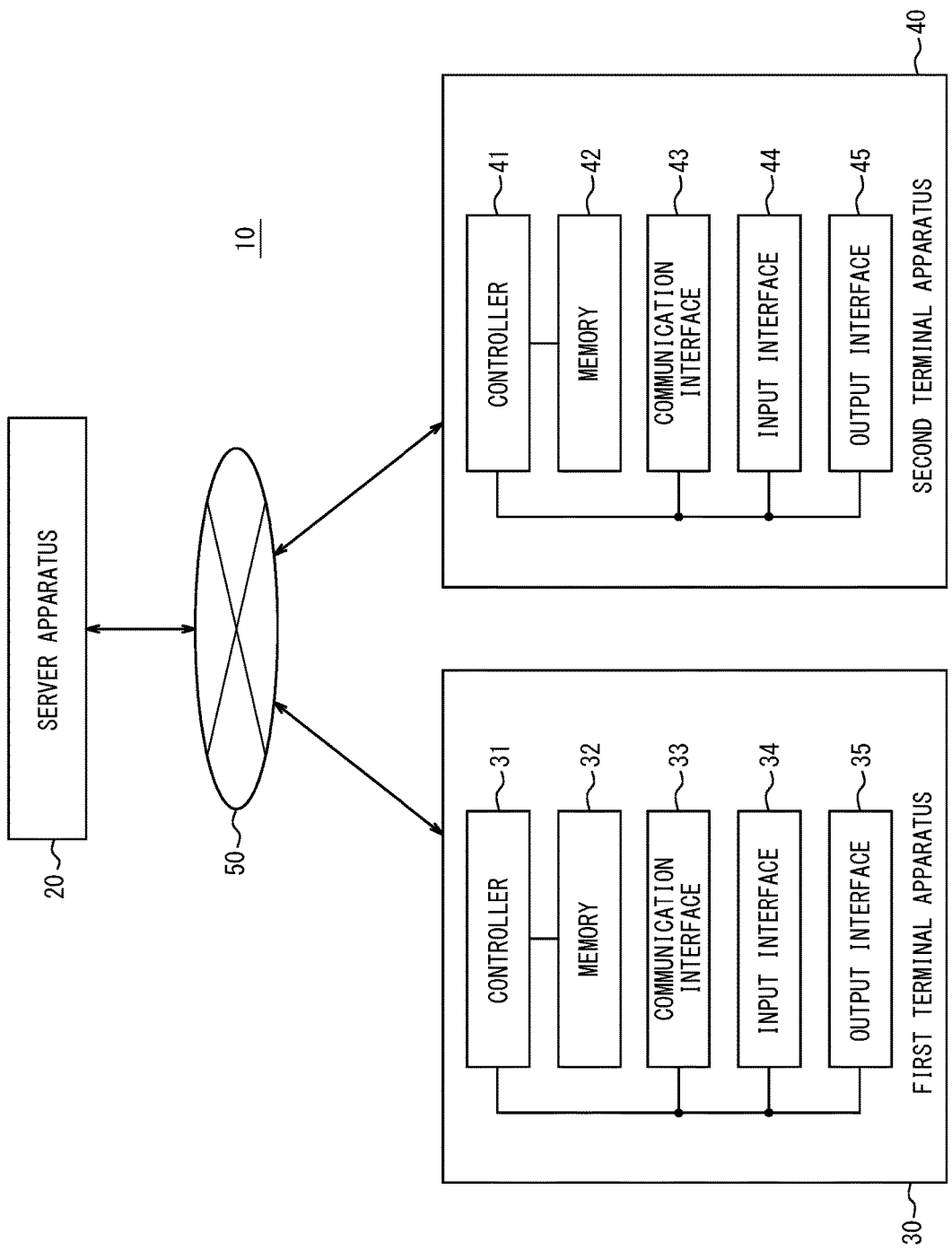
FIG. 1 is a block diagram illustrating a configuration of a communication system according to an embodiment of the present disclosure.

An embodiment of the present disclosure will be described below, with reference to the drawings.

In the drawings, the same or corresponding portions are denoted by the same reference numerals. In the descriptions of the present embodiment, detailed descriptions of the same or corresponding portions are omitted or simplified, as appropriate.

A configuration of a communication system 10 according to the present embodiment will be described with reference to FIG. 1.

The communication system 10 includes a server apparatus 20, a first terminal apparatus 30, and a second terminal apparatus 40. The server apparatus 20 can communicate with the first terminal apparatus 30 and the second terminal apparatus 40 via a network 50. The first terminal apparatus 30 may be able to communicate with the second terminal apparatus 40 via the network 50.

The server apparatus 20 is installed in a facility such as a data center, and operated by a service provider. The server apparatus 20 is a server computer that belongs to a cloud computing system or another type of computing system.

The first terminal apparatus 30 is installed in a first space V1 in which a first user U1 is present, and is used by the first user U1. The first terminal apparatus 30 is, for example, a general purpose computer, such as a PC, or a dedicated computer specialized for a particular calculation. The term "PC" is an abbreviation of personal computer.

The second terminal apparatus 40 is installed in a second space V2 in which a second user U2 is present, and is used by the second user U2. The second space V2 is separate from the first space V1. The second terminal apparatus 40 is, for example, a general purpose computer, such as a PC, or a dedicated computer specialized for a particular calculation.

The network 50 includes the Internet, at least one WAN, at least one MAN, or any combination thereof. The term "WAN" is an abbreviation of wide area network. The term "MAN" is an abbreviation of metropolitan area network. The network 50 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation of local area network.

An outline of the present embodiment will be described with reference to FIGS. 1 and 2.

The second terminal apparatus 40 is a terminal apparatus that displays a user image 60 to the second user U2. The user image 60 is an image of the first user U1. The second terminal apparatus 40 displays a first image 61, together with the user image 60, on a vertical display plane 47, which extends in a vertical direction. The first image 61 is an image of a desk or floor. The second terminal apparatus 40 displays a second image 62 on a horizontal display plane 48, which is adjacent to a lower end of the vertical display plane 47 and extends in a horizontal direction. The second image 62 is a continuous image with the first image 61. When displaying the first image 61 and the second image 62, the second terminal apparatus 40 draws a pattern on the first image 61 and a pattern on the second image 62 as continuous patterns with each other.

In the present embodiment, it is easier for the second user U2 to have the illusion of sharing the same desk or room with the interlocutor because the pattern on the desk or floor on the side of the interlocutor and the pattern on the desk or floor on the side of the second user U2 are continuous. Therefore, the present embodiment makes it easier for the second user U2 to have the sense of being in the same space as the first user U1. Moreover, the present embodiment has fewer restrictions than the conventional system, allowing for greater flexibility in application. For example, the present embodiment can be applied to general purpose applications for online communication using videos, such as web conferencing applications. As a result, when users in different spaces communicate with each other, the users can easily have the senses of being in the same space with each other.

In the present embodiment, when displaying the first image 61 and the second image 62, the second terminal apparatus 40 draws, on the first image 61, a shadow 63 of the first user U1 reflected on the desk or floor, and draws, on the second image 62, an extension 64 of the shadow 63.

In the present embodiment, it looks to the second user U2 as if the shadow 63 of the interlocutor reflected on the desk or floor extends to the side of the second user U2, which makes it easier for the second user U2 to have the stronger illusion of sharing the same desk or room with the interlocutor. Therefore, the present embodiment makes it further easier for the second user U2 to have the sense of being in the same space as the first user U1.

Figure 2:
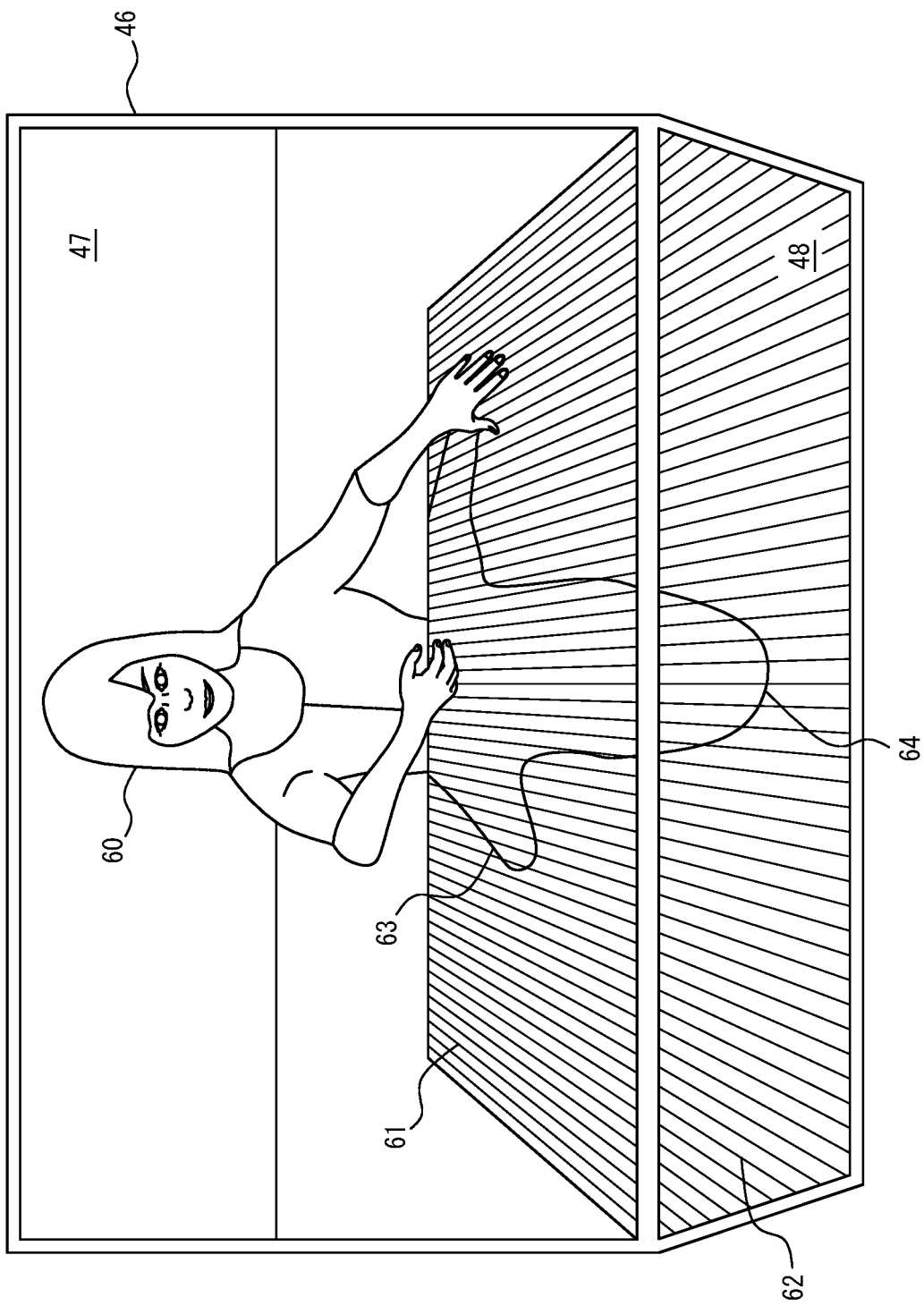
FIG. 2 is a diagram illustrating an example of image display on vertical and horizontal display planes according to the embodiment of the present disclosure.

In the example in FIG. 2, an L-shaped display 46 in side view with a vertical display plane 47 and a horizontal display plane 48 is used. The display 46 is, for example, an LCD or an organic EL. The term "LCD" is an abbreviation of liquid crystal display. The term "EL" is an abbreviation of electro luminescent. The vertical display plane 47 displays a video of a virtual three-dimensional space that includes an avatar of an interlocutor, as a user image 60, and an object of a desk placed in front of the avatar of the interlocutor, as a first image 61. A pattern such as wood grain is drawn on a top surface of the desk. The horizontal display plane 48 displays, as a second image 62, a video of a top surface of a continuous desk with the desk displayed on the vertical display plane 47. In this video, a continuous pattern with the pattern on the top surface of the desk displayed on the vertical display plane 47 is drawn. On the top surface of the desk displayed on the vertical display plane 47, a shadow 63 of the interlocutor is displayed. On the top surface of the desk displayed on the horizontal display plane 48, an extension 64 of the shadow 63 of the interlocutor is displayed.

Instead of the desk pattern, a floor pattern may be drawn in a continuous manner. In such a variation, the vertical display plane 47 displays a video of a virtual three-dimensional space that includes an avatar of an interlocutor, as a user image 60, and an object of a floor on which the avatar of the interlocutor is present, as a first image 61. On a surface of the floor, a pattern, such as the grain of flooring planks or the way the planks are planked, is drawn. The horizontal display plane 48 displays a video of a surface of a continuous floor with the floor displayed on the vertical display plane 47 is displayed, as a second image 62. In this video, a continuous pattern with the pattern on the surface of the floor displayed on the vertical display plane 47 is drawn. On the surface of the floor displayed on the vertical display plane 47, a shadow 63 of the interlocutor is displayed. On the surface of the floor displayed on the horizontal display plane 48, an extension 64 of the shadow 63 of the interlocutor is displayed.

Instead of the display 46, a projector may be used. In such a variation, a video of a virtual three-dimensional space that includes a user image 60 and a first image 61 is projected onto a vertical screen or wall, as a vertical display plane 47. A second image 62 is projected onto a horizontal screen, desk, or floor, as a horizontal display plane 48.

Figure 3:
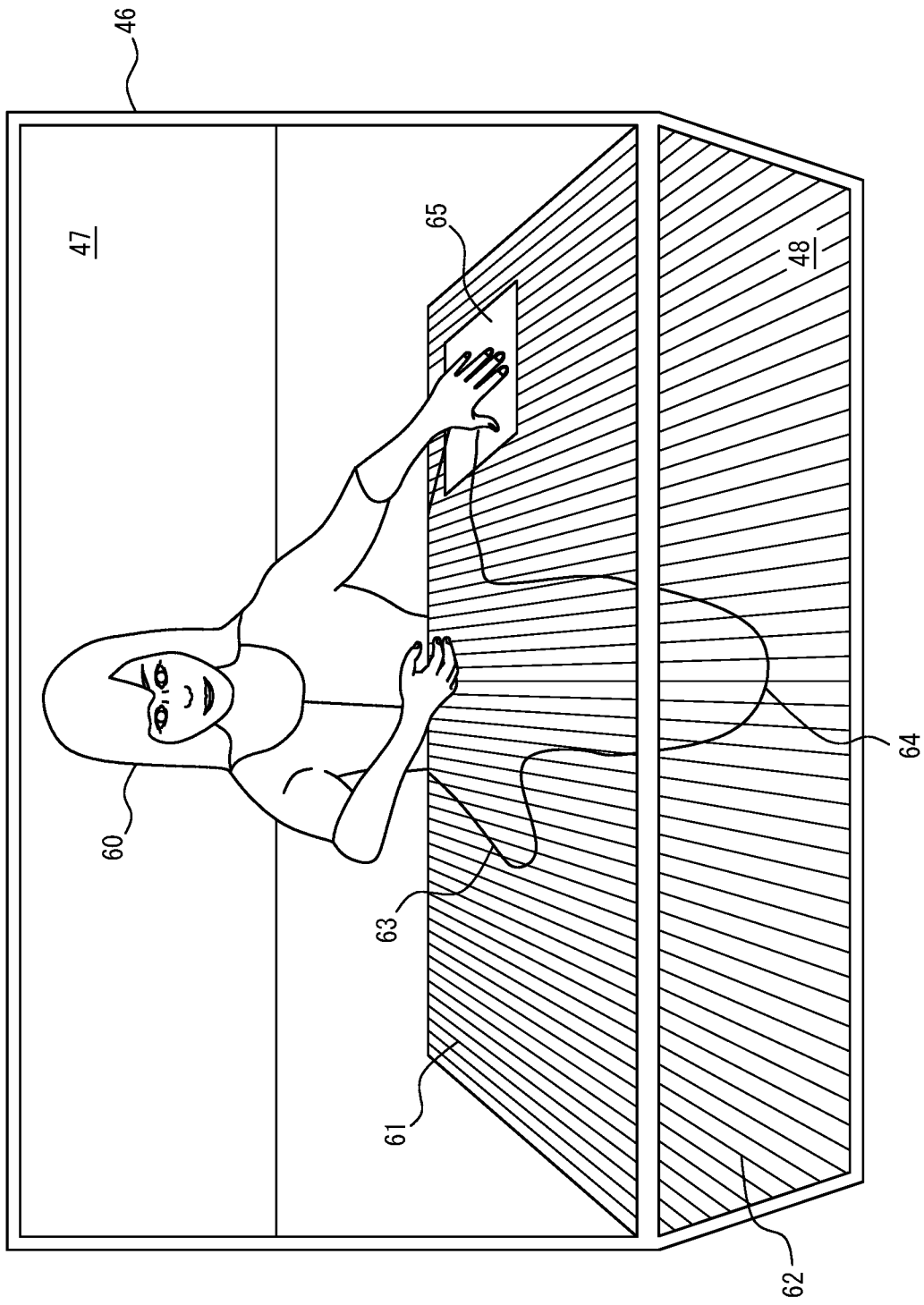
FIG. 3 is a diagram illustrating an example of image display on the vertical and horizontal display planes according to the embodiment of the present disclosure.
Figure 4:
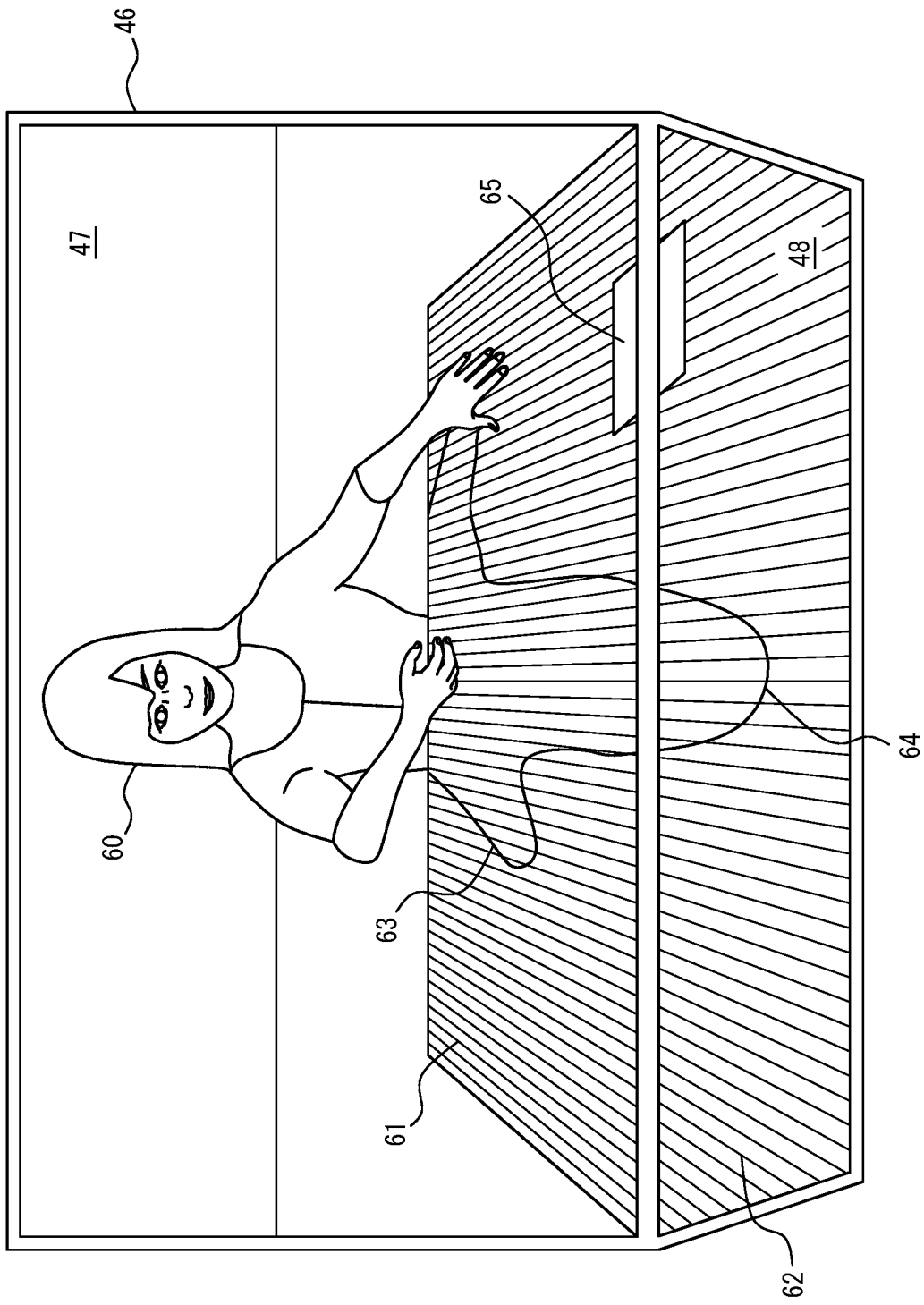
FIG. 4 is a diagram illustrating an example of image display on the vertical and horizontal display planes according to the embodiment of the present disclosure.

As a variation of the present embodiment, as illustrated in FIG. 3, the second terminal apparatus 40 may further display, on the vertical display plane 47, an image 65 of an object placed on the desk or floor. As illustrated in FIGS. 4 and 5, the second terminal apparatus 40 may move the image 65 of the object from the vertical display plane 47 to the horizontal display plane 48 in response to an operation by the first user U1 to slide the object forward of the first user U1.

This variation enables to hand over objects, such as memos, on the desk or floor.

In the example in FIG. 3, a paper-like object is additionally displayed on the top surface of the desk displayed on the vertical display plane 47, at a position at which a left hand of the avatar of the first user U1 is placed. The first user U1 can write text or draw a picture on this object. When the first user U1 slides the object forward with the left hand, the object moves from the vertical display plane 47 to the horizontal display plane 48, as in the example in FIG. 4. In the example in FIG. 5, the object is displayed on the top surface of the desk displayed on the horizontal display plane 48.

Instead of the top surface of the desk, an object may be displayed on a surface of a floor. In such a variation, an additional object is displayed on a surface of a floor displayed on the vertical display plane 47. When the first user U1 slides the object forward with a hand or foot, the object moves from the vertical display plane 47 to the horizontal display plane 48. As a result, the object is displayed on a surface of a floor displayed on the horizontal display plane 48.

A configuration of the first terminal apparatus 30 according to the present embodiment will be described with reference to FIG. 1.

The first terminal apparatus 30 includes a controller 31, a memory 32, a communication interface 33, an input interface 34, and an output interface 35.

The controller 31 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 31 executes processes related to operations of the first terminal apparatus 30 while controlling components of the first terminal apparatus 30.

The memory 32 includes at least one semiconductor memory, at least one magnetic memory, at least one optical memory, or any combination thereof. The semiconductor memory is, for example, RAM, ROM, or flash memory. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The flash memory is, for example, SSD. The term "SSD" is an abbreviation of solid-state drive. The magnetic memory is, for example, HDD. The term "HDD" is an abbreviation of hard disk drive. The memory 32 functions as, for example, a main memory, an auxiliary memory, or a cache memory. The memory 32 stores data to be used for the operations of the first terminal apparatus 30 and data obtained by the operations of the first terminal apparatus 30.

The communication interface 33 includes at least one interface for communication. The interface for communication is, for example, an interface compatible with a wired LAN communication standard such as Ethernet® (Ethernet is a registered trademark in Japan, other countries, or both), or an interface compatible with a wireless LAN communication standard such as IEEE802.11 or a mobile communication standard such as LTE, the 4G standard, or the 5G standard. The name "IEEE" is an abbreviation of Institute of Electrical and Electronics Engineers. The term "LTE" is an abbreviation of Long Term Evolution. The term "4G" is an abbreviation of 4th generation. The term "5G" is an abbreviation of 5th generation. The communication interface 33 communicates with the server apparatus 20. The communication interface 33 may also communicate with the second terminal apparatus 40. The communication interface 33 receives data to be used for the operations of the first terminal apparatus 30, and transmits data obtained by the operations of the first terminal apparatus 30.

The input interface 34 includes at least one interface for input. The interface for input is, for example, a physical key, a capacitive key, a pointing device, a touch screen integrally provided with a display, a camera, a LiDAR sensor, or a microphone. "LiDAR" is an abbreviation of light detection and ranging. The input interface 34 accepts an operation for inputting data to be used for the operations of the first terminal apparatus 30. The input interface 34, instead of being included in the first terminal apparatus 30, may be connected to the first terminal apparatus 30 as an external input device. As an interface for connection, an interface compliant with a standard such as USB, HDMI® (HDMI is a registered trademark in Japan, other countries, or both), or Bluetooth® (Bluetooth is a registered trademark in Japan, other countries, or both) can be used. The term "USB" is an abbreviation of Universal Serial Bus. The term "HDMI®" is an abbreviation of High-Definition Multimedia Interface.

The output interface 35 includes at least one interface for output. The interface for output is, for example, a display or a speaker. The display is, for example, an LCD or an organic EL display. The output interface 35 outputs data obtained by the operations of the first terminal apparatus 30. The output interface 35, instead of being included in the first terminal apparatus 30, may be connected to the first terminal apparatus 30 as an external output device. As an interface for connection, an interface compliant with a standard such as USB, HDMI®, or Bluetooth® can be used.

The functions of the first terminal apparatus 30 are realized by execution of a program according to the present embodiment by a processor serving as the controller 31. That is, the functions of the first terminal apparatus 30 are realized by software. The program causes a computer to execute the operations of the first terminal apparatus 30, thereby causing the computer to function as the first terminal apparatus 30. That is, the computer executes the operations of the first terminal apparatus 30 in accordance with the program to thereby function as the first terminal apparatus 30.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the first terminal apparatus 30 may be realized by a programmable circuit or a dedicated circuit serving as the controller 31. That is, some or all of the functions of the first terminal apparatus 30 may be realized by hardware.

A configuration of the second terminal apparatus 40 according to the present embodiment will be described with reference to FIG. 1.

The second terminal apparatus 40 includes a controller 41, a memory 42, a communication interface 43, an input interface 44, and an output interface 45.

The controller 41 includes at least one processor, at least one programmable circuit, at least one dedicated circuit, or any combination thereof. The processor is a general purpose processor such as a CPU or a GPU, or a dedicated processor that is dedicated to specific processing. The programmable circuit is, for example, an FPGA. The dedicated circuit is, for example, an ASIC. The controller 41 executes processes related to operations of the second terminal apparatus 40 while controlling components of the second terminal apparatus 40.

The memory 42 includes at least one semiconductor memory, at least one magnetic memory, at least one optical memory, or any combination thereof. The semiconductor memory is, for example, RAM, ROM, or flash memory. The RAM is, for example, SRAM or DRAM. The ROM is, for example, EEPROM. The flash memory is, for example, SSD. The magnetic memory is, for example, HDD. The memory 42 functions as, for example, a main memory, an auxiliary memory, or a cache memory. The memory 42 stores data to be used for the operations of the second terminal apparatus 40 and data obtained by the operations of the second terminal apparatus 40.

The communication interface 43 includes at least one interface for communication. The interface for communication is, for example, an interface compatible with a wired LAN communication standard such as Ethernet®, or an interface compatible with a wireless LAN communication standard such as IEEE802.11 or a mobile communication standard such as LTE, the 4G standard, or the 5G standard. The communication interface 43 communicates with the server apparatus 20. The communication interface 43 may also communicate with the first terminal apparatus 30. The communication interface 43 receives data to be used for the operations of the second terminal apparatus 40, and transmits data obtained by the operations of the second terminal apparatus 40.

The input interface 44 includes at least one interface for input. The interface for input is, for example, a physical key, a capacitive key, a pointing device, a touch screen integrally provided with the display 46, a camera, a LiDAR sensor, or a microphone. The input interface 44 accepts an operation for inputting data to be used for the operations of the second terminal apparatus 40. The input interface 44, instead of being included in the second terminal apparatus 40, may be connected to the second terminal apparatus 40 as an external input device. As an interface for connection, an interface compliant with a standard such as USB, HDMI®, or Bluetooth® can be used.

The output interface 45 includes at least one interface for output. The interface for output is, for example, the display 46 or a speaker. The output interface 45 outputs data obtained by the operations of the second terminal apparatus 40. The output interface 45, instead of being included in the second terminal apparatus 40, may be connected to the second terminal apparatus 40 as an external output device. As an interface for connection, an interface compliant with a standard such as USB, HDMI®, or Bluetooth® can be used.

The functions of the second terminal apparatus 40 are realized by execution of another program according to the present embodiment by a processor serving as the controller 41. That is, the functions of the second terminal apparatus 40 are realized by software. The program causes a computer to execute the operations of the second terminal apparatus 40, thereby causing the computer to function as the second terminal apparatus 40. That is, the computer executes the operations of the second terminal apparatus 40 in accordance with the program to thereby function as the second terminal apparatus 40.

Some or all of the functions of the second terminal apparatus 40 may be realized by a programmable circuit or a dedicated circuit serving as the controller 41. That is, some or all of the functions of the second terminal apparatus 40 may be realized by hardware.

The operations of the second terminal apparatus 40 according to the present embodiment will be described with reference to FIG. 6. These operations correspond to an image display method according to the present embodiment.

The processes in steps S101 and S102 are repeated while the first user U1 and the second user U2 are performing video-based communication, such as web conferencing, using the first terminal apparatus 30 and the second terminal apparatus 40, respectively.

In step S101, the controller 41 of the second terminal apparatus 40 receives first data D1 including a user image 60 and a first image 61 from the server apparatus 20 via the communication interface 43, and transmits an image of the second user U2 to the server apparatus 20 via the communication interface 43. The user image 60 is an image of the first user U1. The first image 61 is an image of a desk or floor. The first data D1 may further include a voice of the first user U1. The controller 41 may further transmit a voice of the second user U2 to the server apparatus 20 via the communication interface 43. The process of step S101 is specifically executed in the following steps.

The controller 31 of the first terminal apparatus 30 captures an image of the first user U1 using a camera as the input interface 34. The controller 31 transmits the captured image to the server apparatus 20 via the communication interface 33. The controller 31 may acquire a voice of the first user U1 via a microphone as the input interface 34, and further transmit the acquired voice to the server apparatus 20 via the communication interface 33. The server apparatus 20 receives the image of the first user U1 from the first terminal apparatus 30 via the network 50. The server apparatus 20 processes the received image as appropriate to produce the user image 60. In the example in FIG. 2, the server apparatus 20 produces, as the user image 60, an avatar of the first user U1 present in a virtual three-dimensional space using the received image. As another example, the server apparatus 20 may use the received image as-is, as the user image 60. The server apparatus 20 further produces the first image 61. In the example in FIG. 2, the server apparatus 20 produces, as the first image 61, an object of a desk placed in front of the avatar of the first user U1 in the virtual three-dimensional space. As another example, the server apparatus 20 may produce, as the first image 61, an image of a desk that overlaps the user image 60 to appear to be placed in front of the first user U1. The server apparatus 20 transmits the produced user image 60 and first image 61, as the first data D1, to the second terminal apparatus 40 via the network 50. When the server apparatus 20 receives the voice of the first user U1 from the first terminal apparatus 30, the server apparatus 20 may include the received voice in the first data D1. The controller 41 of the second terminal apparatus 40 receives the first data D1 from the server apparatus 20 via the communication interface 43.

The controller 41 of the second terminal apparatus 40 captures an image of the second user U2 using a camera as the input interface 44. The controller 41 transmits the captured image to the server apparatus 20 via the communication interface 43. The controller 41 may acquire a voice of the second user U2 via a microphone as the input interface 44, and further transmit the acquired voice to the server apparatus 20 via the communication interface 43. The server apparatus 20 receives the image of the second user U2 from the second terminal apparatus 40 via the network 50. The server apparatus 20 processes the received image as appropriate to produce an image similar to the user image 60. The server apparatus 20 further produces an image similar to the first image 61. The server apparatus 20 transmits second data D2 including the produced images to the first terminal apparatus 30 via the network 50. When the server apparatus 20 receives the voice of the second user U2 from the second terminal apparatus 40, the server apparatus 20 may include the received voice in the second data D2. The controller 31 of the first terminal apparatus 30 receives the second data D2 from the server apparatus 20 via the communication interface 33.

In step S102, the controller 41 of the second terminal apparatus 40 displays the user image 60 and first image 61 included in the first data D1 received in step S101 on the vertical display plane 47 of the display 46 as the output interface 45, and displays a second image 62 on the horizontal display plane 48 of the display 46. The second image 62 is a continuous image with the first image 61. When the first data D1 includes the voice of the first user U1, the controller 41 outputs the voice of the first user U1 from a speaker as the output interface 45.

A procedure of processes to be performed in step S102 to display the first image 61 and the second image 62 will be described with reference to FIG. 7.

In step S201, the controller 41 of the second terminal apparatus 40 draws a pattern on the first image 61 and a pattern on the second image 62 as continuous patterns with each other. In the example in FIG. 2, when the controller 41 displays, as the first image 61 on the vertical display plane 47, the object of the desk placed in front of the avatar of the first user U1 in the virtual three-dimensional space, the controller 41 draws a pattern such as wood grain on a top surface of the desk. When the controller 41 displays, as the second image 62 on the horizontal display plane 48, a video of a top surface of a continuous desk with the desk to be displayed on the vertical display plane 47, the controller 41 draws, on the video, a continuous pattern with the pattern on the top surface of the desk to be displayed on the vertical display plane 47. As another example, in a case in which the first data D1 includes an image captured by the first terminal apparatus 30 as-is as the user image 60, when displaying, as the first image 61 on the vertical display plane 47, an image of a desk that overlaps the user image 60 to appear to be placed in front of the first user U1, the controller 41 may draw a pattern such as wood grain on a top surface of the desk. When displaying, as the second image 62 on the horizontal display plane 48, an image of a top surface of a continuous desk with the desk to be displayed on the vertical display plane 47, the controller 41 draws, on the image, a continuous pattern with the pattern on the top surface of the desk to be displayed on the vertical display plane 47. The patterns on the first image 61 and second image 62 may be set and drawn independently by the controller 41 to be continuous with each other, or may be set by the server apparatus 20 to be continuous with each other and drawn by the controller 41 according to the setting. The second image 62 may be produced independently by the controller 41, or may be produced by the server apparatus 20 and received from the server apparatus 20 via the communication interface 43 by the controller 41 in step S101.

In step S202, the controller 41 of the second terminal apparatus 40 draws, on the first image 61, a shadow 63 of the first user U1 reflected on the desk or floor, and draws, on the second image 62, an extension 64 of the shadow 63. In the example in FIG. 2, when displaying the object of the desk placed in front of the avatar of the first user U1 on the vertical display plane 47, the controller 41 calculates the shapes, sizes, and orientations of a shadow 63 and its extension 64 from the positional relationships of a light source, the avatar of the first user U1, and the object of the desk in the virtual three-dimensional space. The controller 41 then draws the shadow 63 and extension 64 on the top surfaces of the desks to be displayed on the vertical display plane 47 and horizontal display plane 48 so as to have the calculated shapes, sizes, and orientations, respectively. The shapes, sizes, and orientations of the shadow 63 and its extension 64 may be calculated by the server apparatus 20, instead of being calculated independently by the controller 41. As another example, when the first data D1 includes the image captured by the first terminal apparatus 30 as-is as the user image 60, the controller 41 may draw a shadow 63 and its extension 64 on the top surfaces of the desks to be displayed on the vertical display plane 47 and horizontal display plane 48 so as to have predetermined shapes, sizes, and orientations, respectively.

The same process as in step S102 is performed in the first terminal apparatus 30 when second data D2 is received from the server apparatus 20. That is, the controller 31 of the first terminal apparatus 30 displays images included in the received second data D2 on a vertical display plane of an L-shaped display in side view, as the output interface 35, and an image similar to the second image 62 on a horizontal display plane of the display. When the second data D2 includes a voice of the second user U2, the controller 31 outputs the voice of the second user U2 from a speaker as the output interface 35.

A variation of the operations of the second terminal apparatus 40 according to the present embodiment will be described with reference to FIG. 8.

The processes in steps S111 and S113 are repeated while the first user U1 and the second user U2 are performing video-based communication, such as web conferencing, using the first terminal apparatus 30 and the second terminal apparatus 40, respectively.

The process in step S111 is the same as the process in step S101 in FIG. 6, except that the first data D1 further includes an image 65 of an object placed on the desk or floor.

Assuming that the controller 31 of the first terminal apparatus 30 displays an image of a desk or floor, as an image similar to the second image 62, on the horizontal display plane of the L-shaped display in side view, as the output interface 35. Upon accepting, via the input interface 34, an operation to add an object on the desk or floor, the controller 31 further displays an image 65 of the object on the horizontal display plane. In the example in FIG. 3, the controller 31 additionally displays a paper-like object on the horizontal display plane at a position at which a real left hand of the first user U1 is placed. The controller 31 may accept an operation to write text or draw a picture on the object via a touch screen as the input interface 34. The controller 31 transmits the image 65 of the object displayed on the horizontal display plane, together with meta-information indicating a display position, to the server apparatus 20 via the communication interface 33. The server apparatus 20 receives the image 65 of the object and the meta-information from the first terminal apparatus 30 via the network 50. The server apparatus 20 processes the received image 65 as appropriate. The server apparatus 20 then includes the processed image 65 in the first data D1 together with the received meta-information, and transmits the first data D1 to the second terminal apparatus 40 via the network 50.

The process in step S112 is the same as the process in step S102 in FIG. 6, and thus a description thereof is omitted.

In step S113, the controller 41 of the second terminal apparatus 40 further displays, on the vertical display plane 47 of the display 46, the image 65 of the object placed on the desk or floor, included in the first data D1 received in step S111. The controller 41 sets a display position of the image 65 on the vertical display plane 47 with reference to the meta-information included in the first data D1. In the example in FIG. 3, the controller 41 additionally displays a paper-like object on the top surface of the desk displayed on the vertical display plane 47, at a position at which a left hand of the avatar of the first user U1 is placed.

Figure 5:
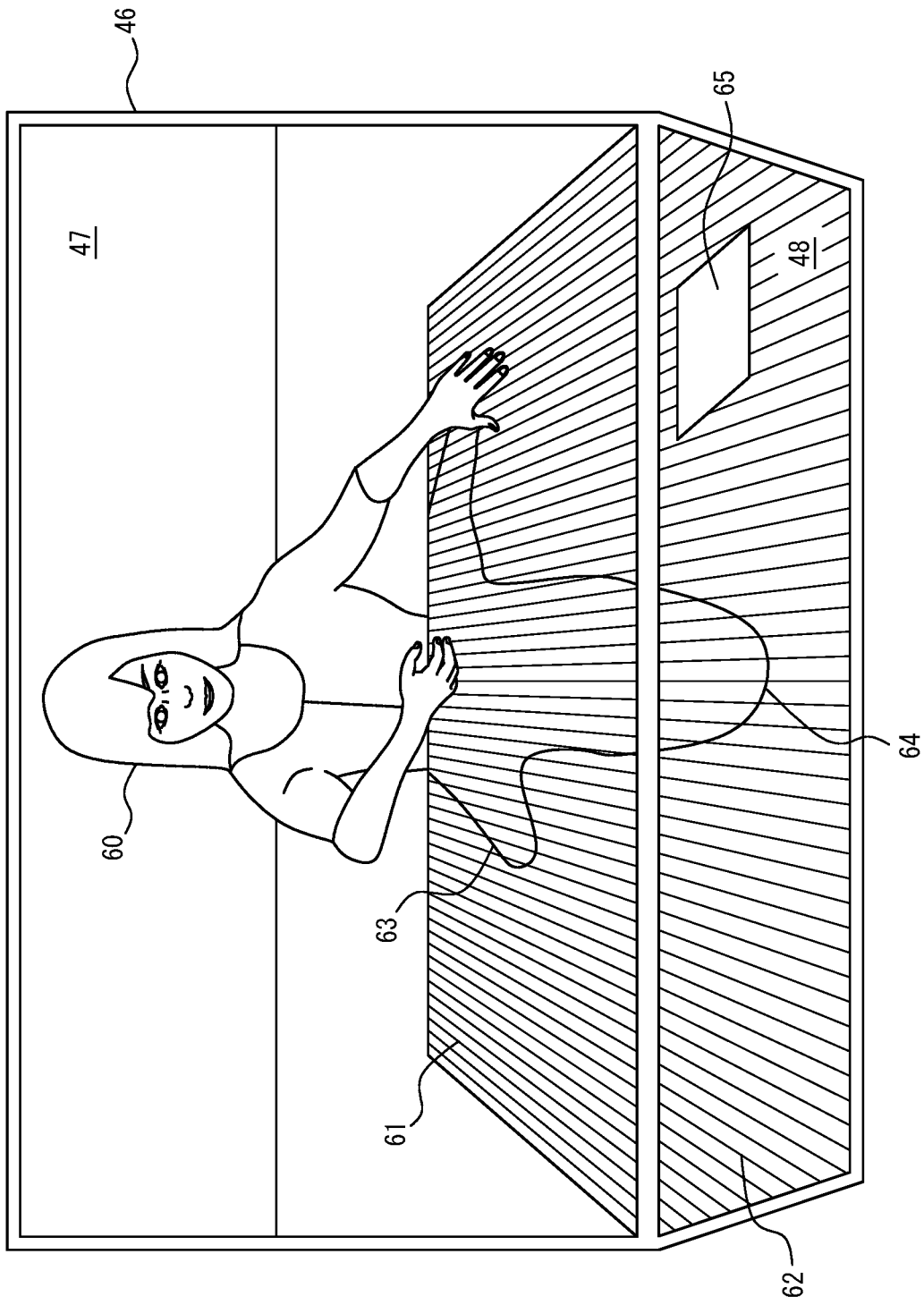
FIG. 5 is a diagram illustrating an example of image display on the vertical and horizontal display planes according to the embodiment of the present disclosure.

In this variation, the controller 41 of the second terminal apparatus 40 may move the image 65 of the object from the vertical display plane 47 to the horizontal display plane 48 in response to an operation by the first user U1 to slide the object placed on the desk or floor forward of the first user U1. In the example of FIGS. 4 and 5, upon accepting, via a touch screen as the input interface 34, an operation by the user U1 to slide a paper-like object forward of the first user U1 with the left hand, the controller 31 of the first terminal apparatus 30, while gradually changing the display position of the object in response to the operation, transmits the image 65 of the object to the server apparatus 20 via the communication interface 33, together with meta-information indicating the display position after the change. Whenever the server apparatus 20 receives the image 65 and meta-information on the object from the first terminal apparatus 30 via the network 50, the server apparatus 20 processes the received image 65 as appropriate. The server apparatus 20 includes the processed image 65 in the first data D1 with the received meta-information, and transmits the first data D1 to the second terminal apparatus 40 via the network 50. Whenever the controller 41 of the second terminal apparatus 40 receives the first data D1 in step S111, the controller 41 displays the image 65 included in the received first data D1 on the vertical display plane 47, horizontal display plane 48, or both, of the display 46. The controller 41 sets a display position of the image 65 in the vertical display plane 47, the horizontal display plane 48, or both, with reference to the meta-information included in the first data D1. In the example in FIG. 4, the controller 41 displays a paper-like object on a boundary between the top surface of the desk displayed on the vertical display plane 47 and the top surface of the desk displayed on the horizontal display plane 48. In the example in FIG. 5, the controller 41 displays a paper-like object on the top surface of the desk displayed on the horizontal display plane 48.

The operations of the first terminal apparatus 30 and the second terminal apparatus 40 may be opposite. That is, while the controller 41 of the second terminal apparatus 40 is displaying a second image 62 on the horizontal display plane 48 of the display 46, the controller 41 may further display an image of an object on the horizontal display plane 48 upon accepting, via the input interface 44, an operation to add the object on the desk or floor. The controller 41 may move the image of the object from the horizontal display plane 48 to the vertical display plane 47 in response to an operation by the second user U2 to slide the object forward of the second user U2.

As a variation of the present embodiment, the controller 41 of the second terminal apparatus 40 may display a user image 60 on the vertical display plane 47 with an offset set so that the first user U1 appears closer to the second user U2 than in reality, and when the first user U1 extends a hand forward, an image of the hand of the first user U1 may be displayed on the horizontal display plane 48 of the display 46 so that the hand appears to float out of the horizontal display plane 48. Conventional methods can be used to give the second user U2 the illusion that the hand appears to float out.

Examples of some embodiments of the present disclosure are described below. However, it should be noted that the embodiments of the present disclosure are not limited to these examples.

[Appendix 1] A terminal apparatus configured to display a user image being an image of a first user to a second user in a second space separate from a first space in which the first user is present, the terminal apparatus comprising a controller configured to:
  display, on a vertical display plane extending in a vertical direction, a first image being an image of a desk or a floor, together with the user image;
  display, on a horizontal display plane extending in a horizontal direction, a second image being a continuous image with the first image, the horizontal display plane being adjacent to a lower end of the vertical display plane; and
  when displaying the first image and the second image, draw a pattern on the first image and a pattern on the second image as continuous patterns with each other.

[Appendix 2] The terminal apparatus according to appendix 1, wherein the controller is configured to, when displaying the first image and the second image, draw, on the first image, a shadow of the first user reflected on the desk or the floor, and draw, on the second image, an extension of the shadow.

[Appendix 3] The terminal apparatus according to appendix 1 or 2, wherein the controller is configured to:
further display, on the vertical display plane, an image of an object placed on the desk or the floor; and
move the image of the object from the vertical display plane to the horizontal display plane in response to an operation by the first user to slide the object forward of the first user.

[Appendix 4] The terminal apparatus according to any one of appendices 1 to 3, wherein the controller is configured to:
further display, on the horizontal display plane, an image of an object; and
move the image of the object from the horizontal display plane to the vertical display plane in response to an operation by the second user to slide the object forward of the second user.

[Appendix 5] The terminal apparatus according to any one of appendices 1 to 4, wherein
the user image includes an avatar of the first user present in a virtual three-dimensional space, and
the first image includes an object of the desk placed in front of the avatar of the first user in the virtual three-dimensional space, or an object of the floor on which the avatar of the first user is present in the virtual three-dimensional space.

[Appendix 6] The terminal apparatus according to any one of appendices 1 to 5, further comprising an L-shaped display in side view, the L-shaped display having the vertical display plane and the horizontal display plane.

[Appendix 7] A program configured to cause a computer to execute operations, the computer being configured to display a user image being an image of a first user to a second user in a second space separate from a first space in which the first user is present, the operations comprising:
displaying, on a vertical display plane extending in a vertical direction, a first image being an image of a desk or a floor, together with the user image;
displaying, on a horizontal display plane extending in a horizontal direction, a second image being a continuous image with the first image, the horizontal display plane being adjacent to a lower end of the vertical display plane; and
when displaying the first image and the second image, drawing a pattern on the first image and a pattern on the second image as continuous patterns with each other.

[Appendix 8] An image display method to display a user image being an image of a first user to a second user in a second space separate from a first space in which the first user is present, the image display method comprising:
displaying, on a vertical display plane extending in a vertical direction, a first image being an image of a desk or a floor, together with the user image;
displaying, on a horizontal display plane extending in a horizontal direction, a second image being a continuous image with the first image, the horizontal display plane being adjacent to a lower end of the vertical display plane; and
when displaying the first image and the second image, drawing a pattern on the first image and a pattern on the second image as continuous patterns with each other.

The present disclosure is not limited to the embodiment described above. For example, two or more blocks described in the block diagram may be integrated, or a block may be divided. Instead of executing two or more steps described in the flowcharts in chronological order in accordance with the description, the steps may be executed in parallel or in a different order according to the processing capability of the apparatus that executes each step, or as required. Other modifications can be made without departing from the spirit of the present disclosure.

The invention claimed is:

1. A terminal apparatus configured to display an image of a first user to a second user in a second space separate from a first space in which the first user is present, the terminal apparatus comprising a controller configured to:
display, on a vertical display plane extending in a vertical direction, a first image of a desk or a floor, together with the image of the first user;
display, on a horizontal display plane extending in a horizontal direction, a second image continuous with the first image, the horizontal display plane being adjacent to a lower end of the vertical display plane;
when displaying the first image and the second image, draw a pattern on the first image and a pattern on the second image as continuous patterns with each other;
display, on the vertical display plane, an image of an object placed on the desk or the floor;
in response to an operation by the first user to write a text or draw a picture on the object, add the text or picture on the image of the object;
move the image of the object with the added text or picture from the vertical display plane to the horizontal display plane in response to an operation by the first user to slide the object with the added text or picture forward of the first user;
display the image of the first user on the vertical display plane with an offset set so that the first user appears closer to the second user than in reality; and
when the first user extends a hand forward, display an image of the hand of the first user on the horizontal display plane so that the hand of the first user appears to float out of the horizontal display plane.

2. The terminal apparatus according to claim 1, wherein the controller is configured to, when displaying the first image and the second image, draw, on the first image, a shadow of the first user reflected on the desk or the floor, and draw, on the second image, an extension of the shadow.

3. The terminal apparatus according to claim 1, wherein the controller is configured to:
move the image of the object with the added text or picture from the horizontal display plane to the vertical display plane in response to an operation by the second user to slide the object with the added text or picture forward of the second user.

4. The terminal apparatus according to claim 1, wherein the image of the first user includes an avatar of the first user in a virtual three-dimensional space, and
the first image includes an object of the desk in front of the avatar of the first user in the virtual three-dimensional space, or an object of the floor on which the avatar of the first user is present in the virtual three-dimensional space.

5. The terminal apparatus according to claim 1, wherein the vertical display plane and the horizontal display plane are part of an L-shaped display in side view.

6. The terminal apparatus according to claim 1, wherein the pattern represents a material of a top surface of the desk or a surface of the floor.

7. A non-transitory computer readable medium storing a program configured to cause a computer to execute operations, the computer being configured to display an image of a first user to a second user in a second space separate from a first space in which the first user is present, the operations comprising:
- displaying, on a vertical display plane extending in a vertical direction, a first image of a desk or a floor, together with the image of the first user;
- displaying, on a horizontal display plane extending in a horizontal direction, a second image continuous with the first image, the horizontal display plane being adjacent to a lower end of the vertical display plane;
- when displaying the first image and the second image, drawing a pattern on the first image and a pattern on the second image as continuous patterns with each other;
- displaying, on the vertical display plane, an image of an object placed on the desk or the floor;
- in response to an operation by the first user to write a text or draw a picture on the object, adding the text or picture on the image of the object;
- moving the image of the object with the added text or picture from the vertical display plane to the horizontal display plane in response to an operation by the first user to slide the object with the added text or picture forward of the first user;
- displaying the image of the first user on the vertical display plane with an offset set so that the first user appears closer to the second user than in reality; and
- when the first user extends a hand forward, displaying an image of the hand of the first user on the horizontal display plane so that the hand of the first user appears to float out of the horizontal display plane.

8. An image display method to display an image of a first user to a second user in a second space separate from a first space in which the first user is present, the image display method comprising:
- displaying, on a vertical display plane extending in a vertical direction, a first image of a desk or a floor, together with the image of the first user;
- displaying, on a horizontal display plane extending in a horizontal direction, a second image continuous with the first image, the horizontal display plane being adjacent to a lower end of the vertical display plane;
- when displaying the first image and the second image, drawing a pattern on the first image and a pattern on the second image as continuous patterns with each other;
- displaying, on the vertical display plane, an image of an object placed on the desk or the floor;
- in response to an operation by the first user to write a text or draw a picture on the object, adding the text or picture on the image of the object;
- moving the image of the object with the added text or picture from the vertical display plane to the horizontal display plane in response to an operation by the first user to slide the object with the added text or picture forward of the first user;
- displaying the image of the first user on the vertical display plane with an offset set so that the first user appears closer to the second user than in reality; and
- when the first user extends a hand forward, displaying an image of the hand of the first user on the horizontal display plane so that the hand of the first user appears to float out of the horizontal display plane.

* * * * *